Figure 1:
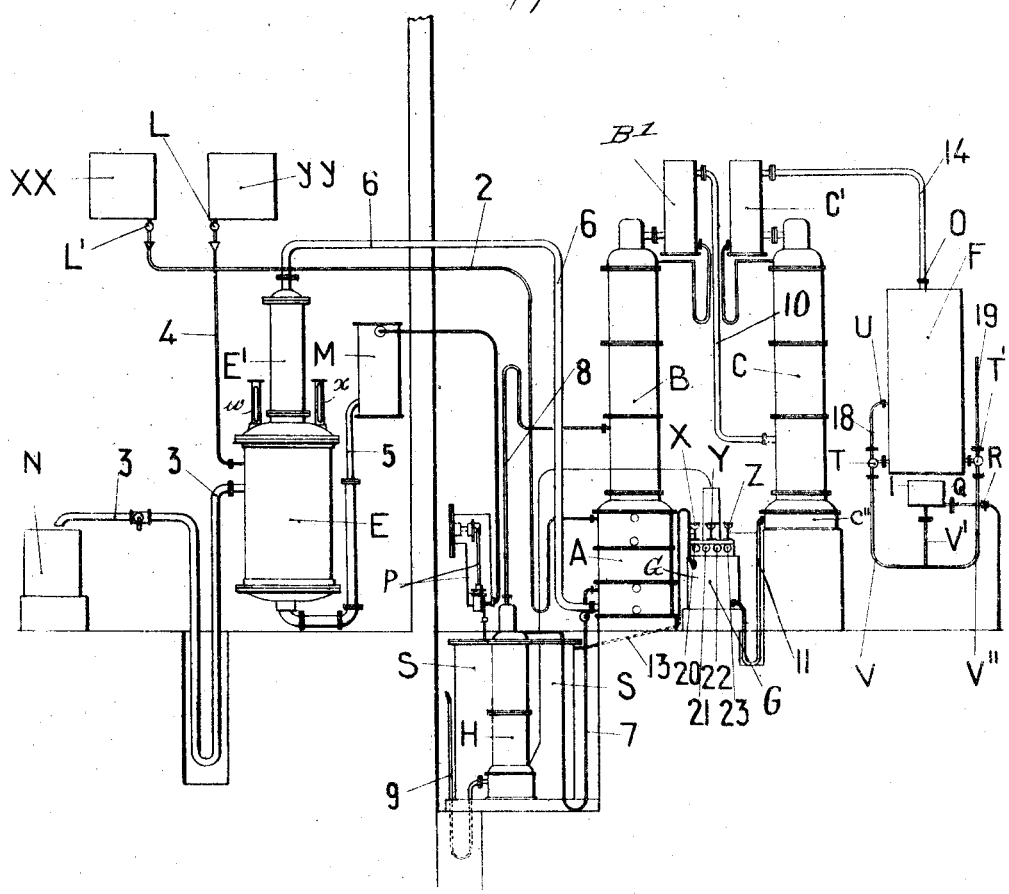

D. ANNARATONE.
APPARATUS FOR PRODUCING ETHER.
APPLICATION FILED NOV. 22, 1909.

1,067,709.

Patented July 15, 1913.

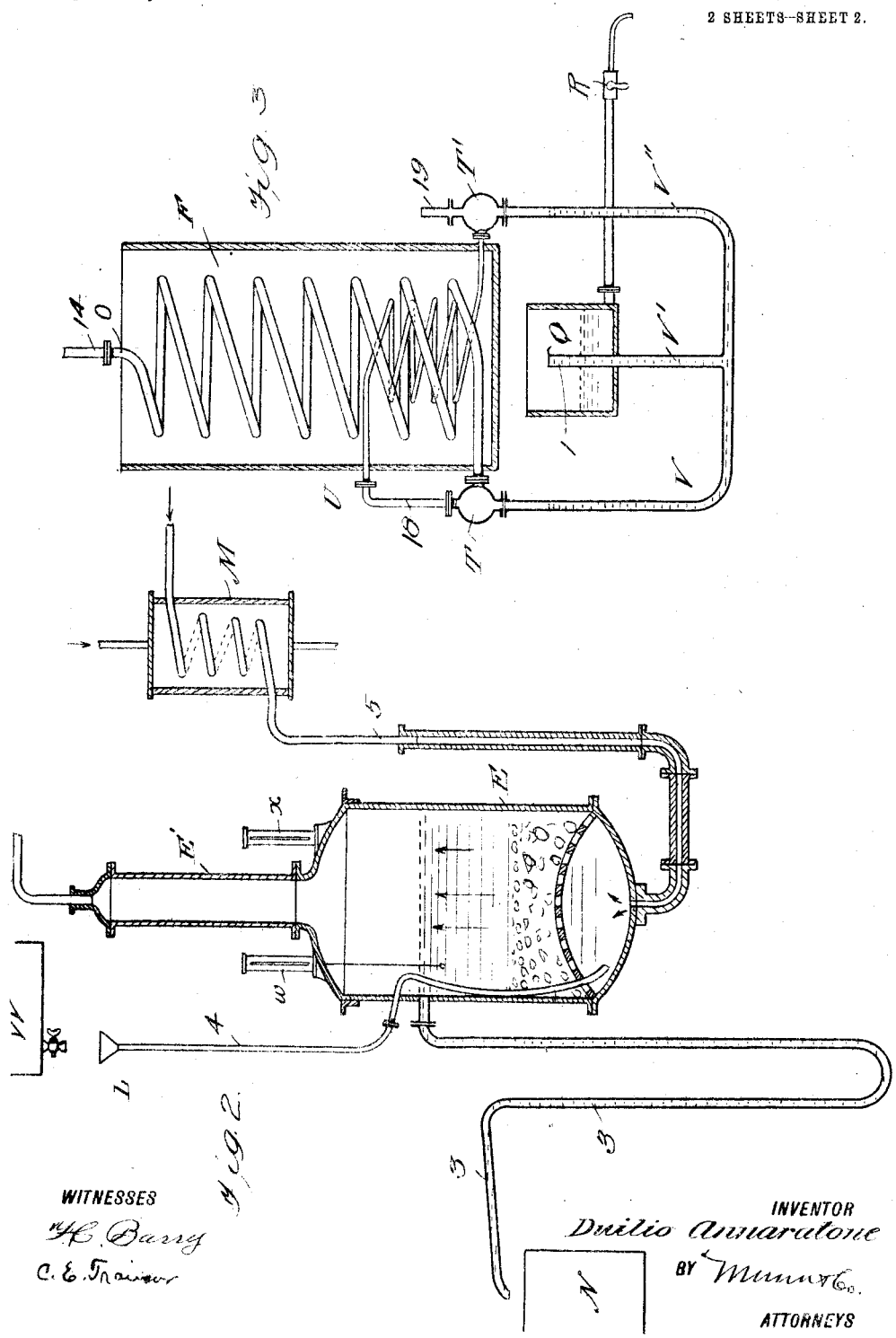

UNITED STATES PATENT OFFICE.

DUILIO ANNARATONE, OF SETTIMO TORINESE, NEAR TURIN, ITALY.

APPARATUS FOR PRODUCING ETHER.

1,067,709.  Specification of Letters Patent.  Patented July 15, 1913.

Application filed November 22, 1909. Serial No. 529,223.

*To all whom it may concern:*

Be it known that I, DUILIO ANNARATONE, a subject of the King of Italy, and a resident of Settimo Torinese, near Turin, Italy, have invented certain new and useful Improvements in Apparatus for Producing Ether, of which the following is a full, clear, and exact description.

The present invention relates to an apparatus for producing ether, my purpose being to render the apparatus highly productive and at the same time comparatively cheap in operation, especially as regards the quantity of fuel and manual labor required.

My invention has, moreover, the advantages of simplicity and compactness.

In the drawings, Figure 1 is a diagrammatic view of the apparatus, Fig. 2 is a central vertical section of the etherifier and superheater, and Fig. 3 is a vertical section of the cooling tank.

A reservoir S, sunken below the surface of the earth, is used as a reservoir for holding the alcohol to be etherified. Connected with this reservoir is a pump P, the stroke of which is variable at will for controlling the alcohol to be used from the reservoir.

At M is a superheater formed of a steam tight reservoir containing a heating coil adapted to be heated by steam under pressure.

At E is an etherifier having the form of an iron reservoir lined internally with lead or with some other material capable of resisting the action of sulfuric acid. This reservoir is filled to a predetermined height with small pieces of sandstone for the purpose of subdividing the vapor into innumerable small streams and to prevent the too rapid mixture of the etherifying fluid therewith during the process of etherification.

The bottom of the reservoir E is heated by any appropriate means, such, for instance, as a heating pipe made of lead and supplied with steam under pressure.

Connected with the reservoir E is a pipe 4 which leads downwardly from a vat y y containing sulfuric acid. A siphon pipe 3 is connected with the reservoir E and is used for discharging an excess of acid from the reservoir E. That is to say, the acid in this reservoir can never climb higher than the top of the siphon pipe. By arrangement of the pipes inside of the reservoir E, the liquid that flows out of this reservoir is drawn from the lowermost part thereof, while the liquid entering this reservoir is admitted at the top and has more or less tendency to remain there. The siphon pipe 3 is connected with the reservoir E and serves for discharging the excess of acid from the reservoir E into the reservoir N.

A thermometer $w$ and a manometer $x$ disposed at the top of the reservoir E indicate the internal pressure and temperature of this reservoir. A cleaning apparatus A is provided for removing impurities from the ether. This cleaning apparatus is formed of two or three segments, each of which supports a plate of the kind usually employed in ether cleaning apparatus. At X X is a vat containing a solution of soda and connected with this vat is a pipe 2 which leads down to the cleaning apparatus A. The solution of soda entering this cleaning apparatus descends gradually from one plate to the other, thereby filling the several segments up to a certain level. Connected with the last segment is a siphon pipe 7 through which the solution of soda is discharged from the cleaning apparatus.

The vapor to be cleaned passes through the cleaning apparatus A in a direction contrary to the direction of travel of the solution of soda, the vapor thus bubbling up through the solution on the various plates. A tower or column B, of the usual type employed for rectifying alcohol, is provided in connection with this apparatus and is supplied with water circulation by means of an attachment B' provided for the purpose. A somewhat similar tower C of the type usually employed for rectifying ether is provided with an attachment C' for supplying water circulation to the tower C and also with a reservoir at the bottom C'' which is heated by a heating coil. A cooling tank F is provided with two heating coils, one being formed of a pipe of large diameter and making turns of considerable width and having its inlet at O and its outlet at T. A second heating coil is mounted inside of the first one and is formed by a very long pipe of smaller diameter, having an inlet at U and an outlet at T'. The tower or column H with its contents is heated from the bottom directly by a steam jet.

The pipe 8 puts in communication the exhausting column H with the column B. The pipes 3—9—7—11 serve as discharging siphons respectively for the apparatus E—H—A—C". L L' are valves for regulating the flow of the acid and of the alkaline solution. The pipe 10 connects the condenser B' with the column C. The pipes 12 and 13 connect the coil G with the reservoir S. Pipe 14 connects the condenser C' with the large coil of the cooling tank F.

T is an empty sphere connecting the outlet of the large coil F with the inlet U of the small coil (by means of a pipe 18) and with pipe V. T' likewise is an empty sphere connecting the outlet of the small coil with the pipes 19 and V".

The pipes V and V" connect with the reservoir Q by means of the pipe V' which ascends in the interior of Q up to the height I.

R is a valve which allows the discharging of the liquid contained in Q.

X Y Z are three test tubes containing a densimeter and a thermometer by means of which it can be known if the apparatus works regularly.

20—21—22—23 are four valves serving, as will be seen farther on, to regulate the working of the apparatus. The use of the double coil refrigerant F by means of which the gas travels the small diameter coil, plunged in its lower part and consequently in the coolest part of the water, permits of completely exhausting the gases leaving the apparatus.

The operation of my device is as follows: The pump P lifts alcohol from the tank S in the precise quantity required for etherification. This alcohol is introduced into the superheater M where it is heated and evaporated at a temperature of 130 degrees. The vapor coming out of the superheater M flows through the pipe 5 at the bottom of the etherifier E. The current of vapor broken up by the sandstone pieces comes into contact with the sulfuric acid and thereby becomes etherified. The crude ether thus obtained, now in the form of vapor, passes rapidly through the liquid and then through the column E' where it deposits such drops of sulfuric acid as it carries with it and such drops as are formed in it by condensation. The vapor now enters the medium flowing through the pipe 6. By starting the apparatus the sulfuric acid contained in the etherifier E is heated to 130 degrees. During the operation no more heat is supplied from the outside. The heat given off by the overheated alcohol and the heat produced by the chemical reaction are more than sufficient, maintaining the temperature of 130 degrees required in the etherification. The sulfuric acid of the etherifier tends at length to become exhausted. To prevent this, acid is supplied continuously from the reservoir y, y, the quantity being regulated by the hand valve L'. About two kilograms of acid are required for each hundred pounds of ether produced. This quantity of acid removes a corresponding quantity of exhausted acid from the bottom of the etherifier, passing out through the siphon 3. Upon emerging from the etherifier the mass of vapor is practically a mixture consisting of ether, water (produced by the reaction between the alcohol and the sulfuric acid,) alcohol, ethylen, and other gases, together with sulfurous acid and other impurities. The purifier A removes the sulfuric acid and various other impurities while the ether and water, the alcohol and various gases pass through the purifier and are afterward separated from each other. This is done by gradually cooling the vaporous mixture so that the different fluids are condensed at different temperatures according to the respective boiling points of the fluids. More particularly stated, this is done as follows: The rectifying column B with its plates and the condenser B' are so proportioned and arranged that they are not affected by vapor at a temperature lower than 80 degrees. The water having a high boiling point is condensed and drips from plate to plate in the purifier, where it mingles with the solution of soda. After a time, on account of the accumulation of water and the solution of soda, the level of the liquid becomes so high in the lowermost segment of the purifier as to reach the pipe 7. This being done the liquid is discharged through the pipe in question and enters the column or tower H. The purpose of this column or tower is to extract the last remaining portions of alcohol contained in the liquid. In this column the liquid drips down from one plate to another, while the current of vapor that enters from the bottom goes up, carrying the alcohol vapor, the latter being again brought to the column B by means of the pipe 8. The exhaust liquid goes out through the siphon pipe 9 and carries with it the water condensed from the steam.

The quantity of soda which enters the purifier is controlled by means of the hand valve L' and is so proportioned relatively to the quantity of acid flowing from the reservoir y, y, that the liquid issuing from the siphon pipe 9 is neutral.

Upon issuing from the member B' the vapor, consisting of alcohol and gases, is conducted to the column or tower C by means of the pipe 10. The column C and the condenser C' are so constructed as to give passage to the vapor only at the temperature of 36 degrees. Consequently, the alcohol and the ether will have a free passage, while the alcohol alone is compelled to descend from one plate to the other, down to the reservoir C". When the level of the liquid in the reservoir C" reaches the height of the pipe 11, the alcohol goes out from the said pipe and is then cooled in the coil G and brought up from the reservoir 8 by means of the pipes 12 or 13. The ether and gases, by coming out of the column or tower C, are brought through the pipe 14 to the coil contained in the tank F, where the ether is condensed, thence goes out through the spherical reservoir T, and filling the pipes V, V', V'' up to the height indicated by the letter I collects in the reservoir Q from which it is extracted by aid of the valve R, and may then be utilized.

The gases following the ether up to the valve T, being unable to pass through the tube V because the latter is filled with liquid, go through the pipe 18 and are compelled to run through the heating coil of the reservoir F which is very long and has a short diameter. In this reservoir the vapor of the ether escaping from the coil is condensed, the ether goes out through the spherical reservoir T and thence through the tubes V'' and V' to the reservoir Q while the gases, divested of every trace of ether, go through the pipe 19 and are discharged into the atmosphere. Test tubes X, Y, Z are provided in connection with the coil or condenser G. The tube X indicates the degree of alcohol returning into the reservoir. The tube Y indicates whether or not the waters coming from the column H are completely exhausted, and the tube Z indicates the degree of ether produced. The action of the apparatus is controlled largely by means of the valves 20, 21, 22, 23, the valves 20 and 23 controlling respectively the supply of water to the towers B and C. The valve 21 controls the supply of vapor in the exhaust column of the water. The valve 22 controls the vapor in the coil of the tank C''. The heating of this tank has the object of eliminating a small quantity of ether which may be contained in the alcohol to be returned to the reservoir S.

By means of the arrangement adopted in my apparatus, the inconvenience of all other apparatus of other systems constructed up to date, is avoided; of requiring to prepare separately the mixture of sulfuric acid and of ethylic alcohol to be introduced into the etherifier. The continuous introduction of sulfuric acid maintains in the mixture a constant etherifying power. Since the mixture cannot be exhausted it never changes, and the apparatus may work for a good many months consecutively without stopping.

The superheater (which may be as described, and also substituted by any other suitable means for evaporating and superheating the alcohol) is intended to prevent the passing of the heat between the acid of the etherifier and the alcohol to be etherified. In other apparatus of other systems in which the alcohol is introduced into the etherifier liquid and cold there is a formation of a large quantity of secondary products (on account of the prolonged contact of the alcohol with the acid) which reduces the production of ether. In applicant's case, contrariwise, the etherification is very rapid, the alcohol remains in contact with the acid a very short time, consequently the formation of secondary products is considerably reduced.

By using the alcohol in the form of superheated vapor, there is the advantage of being able to reduce the masses of etherifiant liquid without reducing the production of the apparatus; consequently very small etherifiers can be used with a great economy of the installation and the consumption of heat to superheat them.

It is not necessary to mix the sulfuric acid and the ethyl alcohol prior to their admission to the apparatus, since this mixture takes place in the superheater M, and any other suitable means may be employed for mixing the acid and the alcohol if desired.

The etherification is very readily obtained by aid of this apparatus, although heretofore it has in other apparatus been very slow.

Owing to the rapidity of the process as carried out by the foregoing apparatus, the formation of the secondary products is reduced considerably.

By employing superheated alcohol there results the advantage of reducing the masses of etherifying liquid without reducing the amount of the product.

Moreover, an apparatus of the kind above described may be made very small and compact for a given output, thereby attaining considerable economy both in the installation and in the fuel required for heating.

Aside from the foregoing advantages, the work of the apparatus is comparatively constant and continuous, it not being necessary to stop the work of the apparatus for any reason.

By using the cooling apparatus F with its double coil, the gases first pass into the lower portion of the apparatus and then through the coolest portion of the water, so that the gases come out entirely exhausted.

The pump takes the alcohol out of the reservoir exactly in the quantity required for its conversion into ether, and pumps it into the superheater where it is evaporated and heated to a temperature of 130 degrees C. From here the vapors are fed from below through a pipe into the receptacle, lined with lead or other material not attacked by sulfuric acid and filled up to a determined height with stone balls in order to properly divide the vapors. Here the vapor comes in contact with the sulfuric acid and is converted into raw ether. The raw ether produced in this manner, goes in the vaporous state, through the liquid quickly and arrives in the receptacle, where the drops of sulfuric acid carried along mechanically are left behind and then passes through a pipe into the cleaning device. At the beginning of the reaction the sulfuric acid contained in the receptacle is heated to 130 degrees C., and during the further operation no further heating is required. The sulfuric acid becomes exhausted after some time, and this defect is remedied by letting in continuously, drop by drop, fresh sulfuric acid. The siphon draws off a corresponding quantity of exhausted acid. The cleaning device containing sodium hydroxid binds the sulfurous acid and the impurities, while ether, water and the gases pass through the liquid one after the other quicker or slower, and are then cooled. The rectifying device and the distilling device are arranged in such manner that only vapors at a temperature lower than 80 degrees C. can pass through. After a certain time the level of the liquid consisting of water, and sodium hydroxid raises in the last compartment of the cleaner, so that the ether can pass into the exhauster column, where the last traces of alcohol are removed. In this column the liquid falls from compartment to compartment, while the current of vapor comes from below, moves from top to bottom and sweeps along the alcoholic vapors. These are returned into the column. The amount of the soda solution flowing downward in the cleaner is regulated by means of a valve in such manner that the liquid on leaving through the siphon has a neutral reaction.

Having thus described my invention, I claim as new and desire to secure by Letters Patent:

1. A device of the character specified, comprising a reservoir for alcohol, a reaction vessel, a superheater, means for conducting alcohol to the superheater and for conducting the gasified alcohol to the reaction vessel and for delivering the said gasified alcohol to the vessel at the bottom thereof, means for conducting sulfuric acid to the reaction vessel and for introducing it near the bottom thereof adjacent to the entering alcohol, said vessel having means for intimately mixing the alcohol and the sulfuric acid as they enter, a siphon connected with the reaction vessel above the center thereof for drawing off the exhausted acid, and means for receiving the ether from the reaction vessel and for purifying the same.

2. An apparatus for the uninterrupted production of ether out of ethyl alcohol and sulfuric acid, comprising a device for superheating the alcohol, and a container partially filled with stone balls for holding the sulfuric acid and the superheated alcohol steam during the reaction between them, means for adding, continuously, alcohol and fresh sulfuric acid to the said container, and means in connection with the said container for withdrawing a continuous stream of used acid therefrom.

In witness whereof, I have hereunto signed my name in the presence of two subscribing witnesses.

DUILIO ANNARATONE.

Witnesses:
PIERRE GIANOHO,
FELIX SAJETTA.